US010093485B1

(12) United States Patent
Gebhardt (10) Patent No.: US 10,093,485 B1
(45) Date of Patent: Oct. 9, 2018

(54) MOUNTING BRACKET FOR LINK CHAIN (71) Applicant: Lawrence S. Gebhardt, Sterling, IL (US)

(72) Inventor: Lawrence S. Gebhardt, Sterling, IL (US)

(73) Assignee: DONGHUA USA, INC., Glendale Heights, IL (US)

( * ) Notice: Subject to any disclaimer, the term of this patent is extended or adjusted under 35 U.S.C. 154(b) by 0 days.

(21) Appl. No.: 15/530,970

(22) Filed: Mar. 30, 2017

(51) Int. Cl.
B65G 19/24 (2006.01)
B65G 17/38 (2006.01)
F16G 15/12 (2006.01)

(52) U.S. Cl.
CPC ............. B65G 17/38 (2013.01); F16G 15/12 (2013.01); B65G 19/24 (2013.01)

(58) Field of Classification Search
CPC ......... F16G 13/06; F16G 13/02; B65G 19/24; B65G 19/245; B65G 19/26; B65G 19/22; B65G 17/42; B65G 19/10
USPC ........ 198/728, 729, 730, 731; 248/201, 501, 248/506
See application file for complete search history.

(56) References Cited

U.S. PATENT DOCUMENTS

| 3,760,935 | A * | 9/1973 | Ziegelmeyer | B65G 17/42 198/731 |
| 4,085,555 | A * | 4/1978 | Mann | E04H 9/04 52/169.6 |
| 8,376,293 | B2 * | 2/2013 | Grady, IV | H05K 7/1489 248/201 |
| 8,567,732 | B2 * | 10/2013 | Gebhardt | F16G 13/12 248/201 |
| 2007/0187213 | A1 * | 8/2007 | Garbagnati | B65G 17/065 198/731 |

* cited by examiner

Primary Examiner — James R Bidwell
(74) Attorney, Agent, or Firm — Lester N. Arnold (57) ABSTRACT Improved L-shaped bracket member of a pair of oppositely disposed back-to-back mirror image bracket members configuring when mounted, an improved replacement link chain for repair of a disconnected chain link drive mechanism, including a base flange mountable by bolt fastener to a substrate member carrying the chain link mechanism, and a perpendicularly depending side flange being of generally flat thickness dimension to define improved uniform gap opening between a pair of oppositely mounted side flanges of the pair of bracket members, and having an aperture extending through the thickness dimension of the side flange positioned with the aperture opening thereof disposed in at least tangential interference with the rotational radius of the bolt fastener to enable the rotating bolt to extend into the aperture opening to remove striking of the bolt with the adjacently disposed side flange when mounting or dismounting the base flange of the improved bracket member.

9 Claims, 2 Drawing Sheets

MOUNTING BRACKET FOR LINK CHAIN

BACKGROUND OF THE INVENTION

Field of the Invention

This invention relates to improved bracket means in the form of a pair of oppositely disposed and parallel mounted bracket members, intended to be mounted in back to back orientation to a suitable substrate carrier member to which the serial connected link chain mechanism is carried. The improved pair of bracket members are applied in pairs as common in the industry to repair broken link chains within selected ones of multiple serial connected parallel spaced links of a link chain mechanism commonly serving as chain drive means for chin driven machinery. It is known to provide rotating sprocket driving means in the form of rotary sprocket gear teeth, wherein individual protruding gear teeth members are aligned with and inserted into one of the spaced cavities defined by the parallel spaced link chain members, wherein the rotational movement of the sprocket member moves the horizontally moving link chain, to in turn impart chain drive movement to the applied machinery as is common in the related industry of chain driven machinery.

This invention relates to the improved bracket members of this invention, applied in back to back oppositely disposed mounting on suitable common substrate member to repair a broken link of the chain mechanism by its bracket members substituting for the pair of spaced apart links which defined a broken link element of the serial connected link chain. The spaced apart link bracket members comprising when in assembly, a pair of oppositely disposed spaced apart L-shaped chain link brackets members acting in assembly to link together disconnected end-to-end parallel spaced continuous chain links of a separated chain drive mechanism. The improved chain link bracket members of the present invention each are configured to provide an L-shaped bracket member or device including a relatively uniform flat-like base flange portion wherein a centrally disposed first aperture means is provided through which a first rotatable fastener means in the form of a hexagonal threaded bolt, is intended to be inserted to mount the base flange portion to underlying adjacent carrier substrate member of a conventional chain link drive mechanism. Further, each L-shaped bracket member includes a generally 90 degree attached or depending relatively flat-like side flange portion thereof having generally elongated width in a link shape and common dimension of a link, and having defined in each of the spaced apart free ends of the link shaped second flange, second apertures defined through which to insert link pins to connect the second flange to the opposite free ends of disconnected adjacently disposed and gapped apart end-to-end oriented chain links whereby the side flange portion provides bridge or linking means to link or connect a selected side of two parallel spaced apart disconnected chain links together, and is mounted to lie in the common plane of symmetry with the selected side of continuous links, and the improvement of this invention is the provision of third aperture means defined to extend through the thickness dimension of the second flange portion, generally located in the lower central planar area of the side flange portion to lie oppositely disposed and adjacent to the inserted first fastener means, wherein the aperture opening the third aperture of the second flange portion of the bracket member, is of sufficient width and height dimension to allow unrestricted rotational movements of the bolt of the first fastener member within the opening defined by the third aperture to prevent any striking contract between the bolt and the adjacent planar areas of the inner surface of the second flange portion of the improved mounting bracket. Thus, the third aperture is provided in the second flange portion of each of the pair of sL-shaped improved link bracket members to disallow any contact interference between rotating fastener means and any adjacently disposed side flange portion of the L-shaped link bracket member in accordance with the present invention.

Background of the Invention

In the relevant art of application of heavy duty industrial drive chains for providing drive movements for chain driven combines and other apparatus and machinery, it is common practice to provide link replacement devices for repair of disconnected chain drive mechanisms, and commonly through use of a pair of chain link bracket members comprising bracket means to reconnect opened or disconnected links of a serial chain link drive mechanisms, utilizing replacement chain link bracket means in the form of L-shaped bracket members that when connected to adjacently disposed free end portions of disconnected end-to-end parallel spaced apart chain link members of a chain link drive, acts to bridge the disconnection and reconnect, repair and restore the continuous interconnection of the parallel spaced dual extended line of chain links of a conventional chain link drive mechanism. It is known in the prior art, to use such chain link bracket devices, such as disclosed by referenced U.S. Pat. No. 8,567,732 B2 ('732) issued Oct. 29, 2013, wherein the inventor thereof is the same inventor of the present invention believed to be an improvement invention over the referenced patented chain link bracket device used in assembly as pair of back-to-back mounted chain link bracket devices, to provide a pair of back-to-back parallel spaced apart and oppositely disposed L-shaped chain link bracket members, combining in their assembly as a pair of replacement chain links to reconnect and rejoin together opposite disposed end-to-end parallel spaced sides of a disconnect double sided chain link drive mechanism. The chain link bracket devices define therebetween when positioned to relink the chain link drive mechanism, a gap opening disposed between the opposing back-to-back oriented chain link bracket devices into which is designed to receive an insertable tooth segment of reciprocal gear drive apparatus, to convert reciprocal movement of the gear drive apparatus to linear movement of the chain link drive mechanism. The pertinent industry of the present invention is the same as the prior art industry of the referenced U.S. Patent No. '732, and is also shown or described in the several patents and/or references cited as prior art in the referenced U.S. Patent No. '732. The inventor believes the present invention to clearly comprise a patentable improvement over the referenced prior art device disclosed as U.S. Patent '732.

Each component chain link bracket member of the bracket assembly as taught in the referenced US Patent '732, includes a flattened uniformly thick base flange and a generally 90 degree depending attached side flange configured in the general shape of an elongated chain link, in combination providing an L-shaped link bracket member, wherein the base flange is provided with a centrally disposed fastener opening to accommodate passage of rotatable fastener such as a bolt with head and threaded shaft, used to mount the base flange to a commonly used chain link carrier substrate, and the side flange is provided with link pin openings on their distal free end portions of the chain link design of the side flange to connect to equally spaced apart openings in the distal ends of chain link plates comprising the chain link drive mechanism of the prior art. Then in accordance with the invention claimed in the referenced US Patent '732, the side flange is provided with a substantial outwardly directed offset dimension in its central region so as to extend substantially throughout its height dimension as measured to extend upwardly from the base flange, for the stated purpose of removing the offset thickness of the side flange from striking interference with the rotational movement of the head of the bolt, including inserting and extracting movements of the bolt. This invention teaches and discloses offsetting the central thickness of the second flange portion of the mounting bracket, for the particular claimed advantage of preventing contact of the rotating head of the bolt fastener with the adjacently disposed inner planar surface of the second flange portion, but by outwardly offsetting the generally central region of the second flange portion into the central space defining between parallel spaced second flange portions, and resulting in the disadvantage of reducing the width of the central space in a manner to interfere with the insertable drive tooth of the sprocket drive means.

In reference to the disclosure of the referenced US Patent '732, it is apparent that the outwardly offset thickness of the side flange is deemed an important element and perhaps the essence of the invention of the mounting brackets therein taught and disclosed, but it has come to the attention of the inventor that this outward offset results in the reducing the gear tooth link gap-opening defined between the spaced apart back-to-back side flanges of the mounted bracket assembly, reducing the gap opening into which the insertable tooth segment of reciprocal gear drive apparatus is to be received in order to provide linear movement of the chain link mechanism. The narrowing of the gap opening between a pair of parallel spaced side flanges is viewed as problematic with inserting and withdrawal movements of the reciprocal toothed drive gear. The present invention provides the entire thickness dimension of the side flange portion of its novel bracket member to be disposed in the common planar symmetry of the connected chain link plates of the chain link mechanism of the prior art, resulting in a maximum dimension for the gap opening defined between the spaced apart back-to-back side flanges mounted in bracket assembly, wherein the gap opening so defined is generally uniform in its dimensions with other successively defined gap openings between the existing and successively occurring spaced apart chain link assemblies of the chain link drive mechanism.

The side flange of the referenced US Patent '732 by providing the offset central thickness in a direction away from the common plane in which it lies, provides for the directional removal (offset) of the central region of the side flange adjacent to the rotating movements of the head of the bolt fastener, but the present invention accomplishes the same effect by providing a novel feature of invention to instead provide an aperture opening through the side flange portion of the novel bracket member in the central lower region of the side flange portion to remove the adjacently disposed section of the inner wall of the side flange to allow free or unrestricted rotational movements of the head of the bolt, and also to provide that the opening is larger than the bolt head and the radius of the rotational movement of the head can encroach or extend into the adjacently disposed third aperture in the lower central region of the side flange of the present invention.

The orientation of the prior art mounting brackets and the improved mounting brackets of the present invention, when mounted in a pair of mounting brackets in assembly of parts to comprise a repair device for prior art chain drive mechanisms, having component parts of outer chain link plates and inner chain link plates linked together by link pins extending through spool-like spacers, wherein the pair of outer and inner chain link plates are replaced by the side flanges of the pair of bracket member, respectively, wherein there is achieved the repair or replacement of a pair of disconnected links of a serially extending chain link drive mechanism, which is taught or disclosed in the referenced U.S. Patent '732. It is readily seen that the side flange of the referenced U.S. Patent '732 is mounted in the same common planar symmetry with the existing unreplaced outer chain link plates, but the offset of the central portion of the side flange encroaches into the gap opening defined between the mounted pair of side flanges to reduce the gap opening. The chain link drive mechanism is also provided with cross-arm substrate members that act as supports for the chain link drive mechanism in a manner known in the prior art. The succession of consecutively occurring pairs of parallel spaced apart connected outer link plates and inner link plates define multiple in-line gap openings therebetween successively reoccurring into which the teeth of a reciprocal sprocket style drive gear are repeatedly inserted to convert rotational gear drive movements in engaging the chain link drive mechanism to provide linear movement of the chain link drive mechanism. The prior art chain link drive mechanism as relates to the present invention, being an improvement invention over the patented bracket assembly of the referenced U.S. Patent '732, is applied to the same prior art chain link mechanism as set forth and described in the referenced U.S. Patent '732, and is thought to be sufficiently taught and disclosed herein without providing a more exhausting detail of this related prior art and the chain link drive mechanism related to this invention, and to the mounting brackets as are taught as novel in the referenced U.S. Patent '732.

In a more detailed discussion, as taught in the referenced U.S. Patent '732, the teaching to provide offset of the side flange in a direction inward to the gap opening formed between a pair of mounted side flanges, results in restricting the width of the gap opening and by providing the offset to extend substantially the entire height dimension of the side flange, result in restricting the width of the gap opening for the entire depth dimension of the gap opening. The extent of this restriction of the dimensions of the gap opening is deemed a disadvantage through reducing the available width and depth dimensions of the gap opening. It is a novel feature of the present invention to provide for the side flange to be without offset in its thickness dimension and to mount in a common planar symmetry with the common plane of the successive outer chain links of the prior art chain link drive mechanism. Both the chain link bracket of this invention and the chain link bracket member of the referenced US Patent '732, include and provide, an L-shaped depending side flange provided with distal apertures utilized to connect the side flange to inner chain links of the prior art chain link drive mechanism. However, the L-shaped brackets of the prior art device disclosed in U.S. Patent '732 are provided with substantial central portions of the side flange portion to be offset in a direction away from the base flange portion and extending into the gap or space defined between the pair of L-shaped chain link bracket members in assembly, resulting in a narrowing of the maximum gap opening of the formed pair of side flange portions. It is noted that the claimed invention of the chain link bracket members of U.S. Patent '732 includes configuration of side flange to provide this inward offset of a substantial central portion of the side flange portion to permit the free non-interfering rotation of the bolt-head of the rotatable fastener means, but results in the narrowing of the gap or space within which to receive the rotating gear teeth drive means. In comparison, the present invention provides a side flange of uniform thickness lying in a common planar symmetry, and provides the same or similar centrally disposed gap opening defined between a pair of mounted side flange members in comparison to the defined gap openings of the remainder of the chain link drive mechanism. To provide for such novel improvement, the side flange of the present invention is provided with a centrally located aperture in the lower central region of the side flange passing through the thickness of the side flange portion and adjacently disposed opposite to the rotatable bolt-head of the fastener for securing the base flange of the bracket member, and being of sufficient opening dimension to permit the possible overlap of the rotational radius of the bolt-head into the side flange central opening without striking interference between the bolt head and the side flange.

In summary, the teachings of the referenced U.S. Patent '732 teach as an advantage to provide to offset substantial central portions of the side flange member of their disclosed L-shaped chain link bracket in order to offset the adjacent central areas of the side flange member in a direction away from the rotatable bolt head of the threaded bolt fastener, so as to prevent rotational interference between the bolt head portion and the side flange, however, the side flange offset is in a direction to result to protrude into the defined gap formed between a pair of L-shaped chain link bracket means in assembly as taught, resulting in a narrowing of gap opening so defined and enhancing possible interference with the repetitive insertable action of toothed gear drive means in accomplishing linear drive movement of the associated chain link mechanism.

The multiple references cited as prior art and teachings of the relevant art in which the prior art related device disclosed by US Patent '732 was found, through patent application examination, to be patentable over, provide an enabling description of the prior art of the present invention, and the U.S. Patent '732 patented device itself, provides the most relevant art in the opinion of the inventor, and yet, the invention presented herein is believed to be a patentable novel improvement over the disclosure of and the teachings of the patented chain link bracket mechanism of US Patent '732. The provision of central aperture provided in the side flange of the bracket member of the present invention, disposed adjacent to and with the opening of the aperture lying within the rotatable circumferential field of the bolt head of the rotating bolt fastener commonly to the prior art, is believed to raise to the level of invention and is believed to be non-obvious from the teachings of U.S. Patent '732. The detailed description of the preferred embodiment of the prior art device of US Patent '732 describes and illustrates the rearward offset of a substantial portion of the central area of the side flange member and shows the rearward offset to be relatively significant. The assembly of a pair of L-shaped chain link brackets of the prior art device of US Patent '732 demonstrate a lessened distance or width dimension between the spaced apart chain link brackets when placed in assembly, and practitioners of the relevant art can readily envision the gap defined therebetween to be narrowed to the point of concern. It is advantageous to provide in the present invention, adding aperture means in the adjacently disposed side flange member to allow the radius of the rotatable bolt-like head portion of the fastener means to encroach only into the dimensional opening of the added aperture means and thus, prevent striking interference of the rotating head portion of the bolt-like fastener used to mount the base flange member with the adjacently disposed side flange member of the L-shaped chain link bracket. The present invention does not read upon the claimed invention of the prior art device of US Patent '732, and does not teach the offset of the side flange member as an element of invention. The prior art device of US Patent '732 does not teach, disclose or make obvious that the offsetting of the side flange member to prevent rotational interference with the rotatable fastener means could be made moot and unnecessary by providing additional aperture opening instead of providing the rearward offset of the side flange member of the disclosed prior art device of US Patent '732.

SUMMARY OF THE INVENTION

The present invention provides an improved chain link bracket assembly comprising a pair of improved mounted chain link bracket members wherein each of the chain link bracket members comprise in combination, a first flange or base flange portion, defining first aperture means generally disposed in the central planar area thereof, for use in attaching the base flange portion to chain link substrate carrier means of chain link drive mechanism by use of rotatable threaded bolt-like fastener means having a head portion and a threaded shank portion, and including generally 90 degree depending second flange or side flange portion attached to and depending from the base flange portion and shaped in same configuration as chain link members of the chain link drive mechanism, providing distal free end portions, and defining second aperture means in the form of spaced apart pair of apertures defined to extend through the outer oppositely disposed free end portions of the side flange portion for use in attaching the side flange portion by second fastener means to disconnected adjacently disposed and gapped apart end-to-end oriented chain links whereby the side flange portion provides bridge means or linking means to link or connect the disconnected links together, and the side flange portion including third aperture means being defined in the generally central lower planar area of the side flange portion and located adjacent to and opposite of the bolt fastener to allow free rotational movements of head portion of the bolt fastener including extending into the dimensional opening of the third aperture, to prevent any striking engagement thereof with the inner planar surface of the side flange of the L-shaped link bracket member of the present invention.

The novel feature of the present invention, which is an improvement invention of the prior art device of US Patent '732 made by the same inventor of the reference prior art device, is the principally the providing of additional aperture means in the side flange portion of the novel L-shaped chain link bracket member of the bracket means of the present invention, in lieu of the rearward offset central area of the side flange portion thereof. The resulting improved L-shaped chain link brackets when in their combined assembly of a pair of L-shaped chain link brackets are shown to define a gap therebetween of maximum dimensions, not lessened by the intrusion of the rearwardly offset side flange portions, and not altering the gap dimensions of the remaining links of the chain mechanism wherein no replacement link brackets have been required.

OBJECTS OF THE INVENTION

It is a novel feature of the present invention to provide L-shaped chain link bracket member having more economical to manufacture in forming an aperture adjacent to the rotating bolt head instead of offsetting the central region of the side flange portion disposed adjacent to the rotatable bolt-like fastener means.

It is another feature of the present invention to design an improved L-shaped chain link bracket member comprising chain link bracket assembly means, to provide maximum spacing of the gap defined between oppositely disposed L-shaped chain link bracket members, and allows for the same spacing into which to receive the tooth gear drive means as other remaining unrepaired links of the chain link mechanism.

It is still another feature to provide aperture means defining an aperture to lie adjacently disposed to and with its opening thereof, spaced to lie within the rotating radius of the bolt-like fastener means so as to eliminate any possibility of striking interference between the rotatable bolt-like fastener means and the adjacently disposed side flange portion of the novel L-shaped chain link bracket means.

It is an object of the invention to provide novel L-shaped chain link bracket means in assembly of a pair of bracket members mounted back to back to define a so-called tooth gap or spacing therebetween in which to receive an individual one of reciprocating gear teeth provided on sprocket drive means, that provides an unaltered tooth gap dimension in comparison to other tooth gaps of the chain link mechanism wherein no replacement link brackets have been required.

It is another object of the invention to provide aperture means in the side flange portion of sufficient width and height of opening resulting in non-interference of the side flange portion at the opening of the aperture means, with the rotational radius of the rotatable bolt-like fastener means, so that the radius dimension of the rotatable bolt-like fastener means is disposed to lie within the opening of the aperture means, wherein the opening of the aperture means is adjacently disposed to the rotatable fastener means.

It is still a further object to provide to have a uniform flattened side flange portion without any portion thereof, including the central dimension thereof, to be offset rearwardly of the planar dimension so as to protrude into the gap to be defined between back to back oriented chain link bracket members mounted in assembly to link a broken or separated chain link drive device.

It is still an additional object of the invention to provide a pair of improved L-shaped chain link bracket members of the present invention in assembly with a link drive chain mechanism, including in combination a base flange portion thereof, and an L-shaped depending side flange portion thereof, and multiple apertures for mounting the chain link bracket members in assembly, and a central aperture defined in the side flange portion generally adjacent to and oppositely disposed to rotatable bolt-like fastener means, to provide non-interference between the rotatable bolt-head and the side flange portion of the novel chain link bracket of the present invention.

Other objects, features and aspects of this invention will become apparent within and as set forth in a detailed description hereinafter set forth, to wit:

DETAILED DESCRIPTION OF THE PREFERRED EMBODIMENT

As shown in the FIGS. 1-8 of the Drawings, the reference numerals or characters used to disclose parts and components, will uniformly refer to the same parts and components, and only general reference to or not showing fully such non-essential elements, parts and components that are generally known in the art, which shall not be shown, or only briefly described, shown, or treated. In the detailed description of the preferred embodiment, numerous and specific details are set forth to provide a clear teaching and illustration of the present invention. Any details of the application of link chains in the industry and the mounting techniques commonly utilized and known, have been purposefully omitted as these details are not deemed or believed to be necessary to provide an understanding of the present invention, and such details are within the knowledge of the persons of ordinary skill in the pertinent art.

Figure 1:
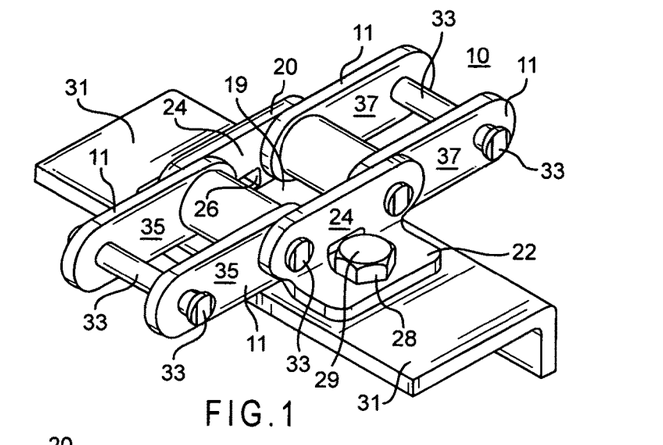
FIG. 1 is an elevated perspective top view of a pair of improved L-shaped chain link bracket members configured in accordance with the present invention in assembly with a link drive chain mechanism, showing the central aperture means adjacent to the bolt head.
Figure 5:
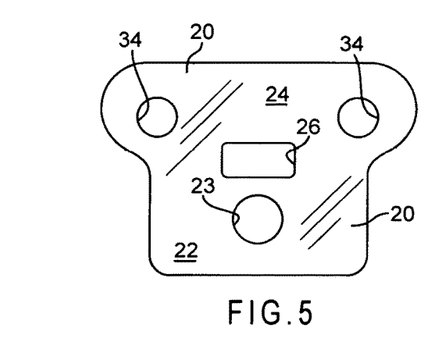
FIG. 5 is a planar frontal view of a flattened stock of the isolated bracket of FIGS. 2, 3 & 4, without fastener device, before being formed to an L-shape and in unmounted orientation illustrating multiple apertures and locations thereof.

In FIG. 1, there is shown a pair of link chain bracket members 20 of same or similar configuration and positioned in accordance with conventional method of mounting a pair of the bracket members 20 in assembly, that is, in spaced apart assembly and connected to spaced end-to-end separated chain links 11 of a heavy-duty chain link drive mechanism 10 of conventional configuration. The chain link drive mechanism 10 is of standard configuration and application in the pertinent art, preferably of the configuration to be linearly driven by drive means (not shown in the drawings) typically consisting of reciprocal moving gear drive means with spaced toothed gear spokes (not shown), insertable into the gap 19 defined between the mounted bracket members 20, thereby engaging the chain link drive mechanism 10 to move the chain link mechanism linearly in conventional fashion. Each of the novel chain link bracket members 20 are formed from planar stock as best shown in FIG. 5 of the Drawings, formed into an L-shaped configuration, and having a base flange portion or element 22 and a depending side flange portion or element 24, depending from the base flange 22 at an angle of approximately 90 degrees, configuring the basic angular-shaped mounting bracket 20.

Figure 2:
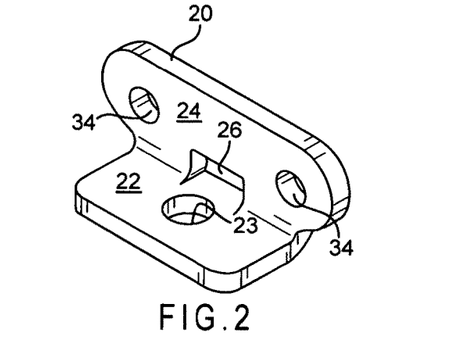
FIG. 2 is an elevated isolated view of one of the pair of improved L-shaped chain link bracket members of the present invention, showing base flange portion thereof and depending side flange portion thereof, and central aperture means disposed in side flange portion.

The base flange 22 is provided with a generally centrally located aperture 23 comprising first aperture means, extending through the thickness dimension, as shown in FIG. 2 of the Drawings, and allows or provides for the insertion of threaded rotatable bolt-like fastener means or element 28, having a bolt-head portion 29 and extending threaded shank portion 30 which is threaded into an underlying cross-arm substrate carrier member or element 31 (illustrated in discontinued length dimension), to mount each of the pair of chain link bracket members 20 to the carrier element 31 by means of bolting the base flange portion 22 thereto in conventional mounting fashion. The side flange portion 24 is configured with an elongated width dimension as compared to the width of the base flange portion 22, giving the appearance of an elongated chain link, and is provided to define a pair of apertures 34 in the spaced apart outer extremities thereof to define second aperture means, extending through the thickness dimension, as shown in the Drawings, and allows or provides for the insertion of a pair of link pins 33 utilized to connect the side flange 24 to a pair of separated chain link elements 35 and 37 of the conventional chain link 11 of the drive mechanism 10, acting to connect the pair of chain link brackets 20 to the chain mechanism 10 to repair and restore the chain link mechanism 10 by connecting the separated chain link elements 35 and 37 as shown in FIG. 1 of the Drawings.

Figure 4:
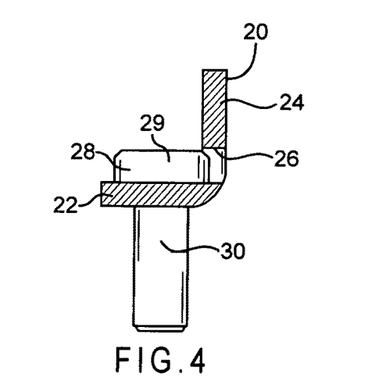
FIG. 4 is a side elevated cross-sectional view of the isolated bracket and bolt-like fastener device of FIG. 3, taken along cross-sectional lines 4-4.

It is in accordance with the present invention, that the side flange 24 is also provided with an aperture 26 comprising third aperture means, extending through the thickness dimension of the side flange 24, as shown in the Drawings, which aperture 26 is provided for the purpose of removing the centrally disposed lower areas of the side flange 24 from potential striking rotational movements by the rotatable bolt-head 29 of the fastener means or element 28, which may otherwise strike the adjacently disposed side flange 24 except for providing the aperture 26 to provide an aperture opening (height and width thereof) of larger dimension than the rotational radius of the bolt-head 29 of the fastener 28, to assure non-interference of the rotating bolt-head 29 of the fastener 28. The aperture 26 is clearly shown in FIG. 1 in both side flanges 24 of the chain link brackets 20. In FIG. 2, the novel chain link bracket member 20 is shown, wherein the first aperture 23 is shown defined in the generally central portion of the base flange 22, the pair of second apertures 34 are shown defined in the outer extremities of the side flange 24, and the third aperture 26 is shown defined in the generally central and lower area of the side flange 24 to be disposed adjacently to and oppositely disposed from the bolt-head 29 with the fastener 28 so when mounted, the aperture 26 prevents the rotatable bolt-head 29 of the fastener 28 to strike or engage the adjacent inner planar surface of the side flange 24, thus, the aperture 26 permits the free rotation of the bolt-head 29 with the side flange 24 through means of having removed the most adjacently disposed side flange 24 though providing the aperture 26. Thus, the circumferential outer edges of the bolt-head 29 of the fastener 28 is permitted to protrude into the opening of the aperture 26 without striking interference with the inner walls of the side flange 24 as shown in FIG. 4. It is also shown in FIG. 2 that the aperture 26 of the side flange 24 may extend into the bendable area or bend or edge line (shown as dashed horizontal lines in FIG. 5) of the 90 degree formation of the L-shaped depending side flange portion 24, but is not deemed desirable to be situated into the base flange portion 22. The flattened stock of the bracket member 20 is also shown in FIG. 5, wherein the aperture 26 is shown disposed generally in the flat side flange 24 so as to lie adjacent to the first aperture 23 intended to accommodate the fastener 28.

Figure 3:
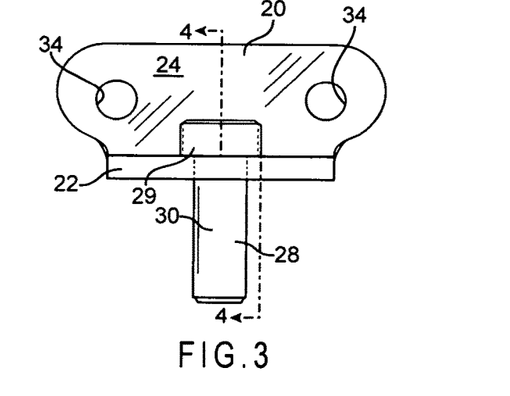
FIG. 3 is a frontal elevated view of the isolated bracket of FIG. 2, adding a bolt-like fastener device with threaded shank portion thereof.
Figure 6:
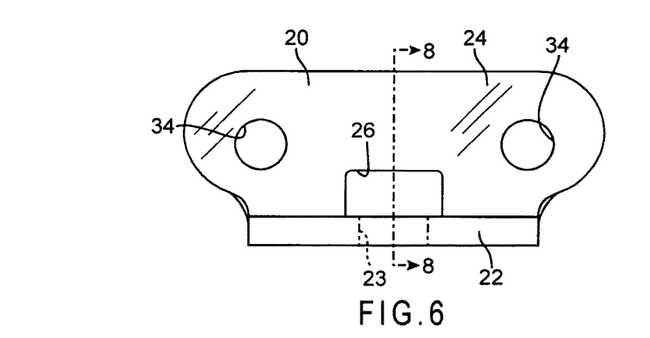
FIG. 6 is another frontal elevated view of the isolated bracket of FIG. 2, or the planar view of FIG. 5 after formation to the L-shaped configuration of FIG. 2, without the fastener device to illustrate the orientation of the multiple apertures defined therein.
Figure 7:
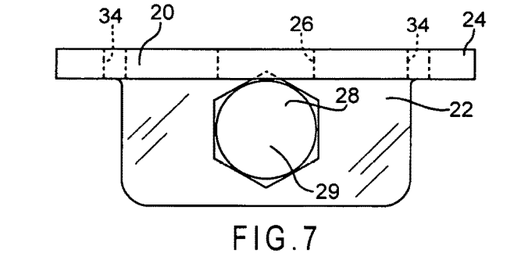
FIG. 7 is a top elevated view of the isolated bracket of FIG. 6, illustrating the mounted bolt head and its circumference and radial dimension entering the central aperture opening of the side flange portion.
Figure 8:
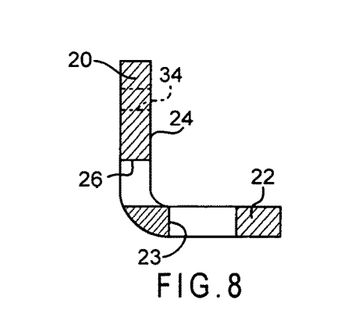
FIG. 8 is a side elevated cross-sectional view of the isolated bracket of FIG. 6, taken along the cross-sectional lines 8-8 of FIG. 6.

FIG. 3 is a frontal elevated view of the isolated chain link bracket 20 of the invention, showing the fastener 28 in mounting orientation extending through first aperture 23 (hidden behind the fastener 28 but seen in FIG. 4 and FIG. 7), and having components of the bolt-head portion 29 and the depending threaded shank portion 30. The aperture 26 is not shown but hidden by bolt head 29 in FIG. 3 but is shown in FIGS. 1, 2, 4, 5, 6, 7 and 8 of the Drawings. FIG. 4 is a side elevated cross sectional view taken along cross section lines 4-4 of FIG. 3, showing the isolated chain link bracket 20 and bolt-like fastener 28, illustrating the slight encroachment of the bolt-head 29 into the aperture 26 of the side flange 24, and showing the aperture 26 in planar alignment with the bolt-head portion 29 resting flush on the base flange 22. It is not required that the bolt head 29 encroach into the aperture 26, but instead to provide that the aperture 26 is of sufficient dimension to allow an encroaching circumferential edge of the bolt head 29 if the selected size of the bolt head 29 is large enough to cause striking of the bolt head 29 with the inner planar surface of the side flange 24 except for providing the adjacent aperture 26 in the lower central region of the side flange 24. FIG. 6 is another frontal elevated view of the isolated chain link bracket 20 of the Drawing, without the fastener device 28 to illustrate the orientation of the multiple apertures defined therein, namely, base aperture 23 shown by dashed lines in the base flange 22, side flange apertures 34, and the central lower third aperture 26, in accordance with the present invention. FIG. 7 is a top elevated view of the chain link bracket 20 showing the base flange 22 and first aperture 23 and showing other apertures 34 and 26 in dashed lines extending through side flange 24. FIG. 8 is a side elevated cross-sectional view of the isolated bracket of FIG. 6, taken along the lines 8-8 of FIG. 6, and shows apertures 23 and 26 at the cross-sectional cut and an aperture 34 by dashed lines extending through side flange 24.

In accordance with the present invention, each of the spaced apart novel L-shaped chain link bracket members 20 consist in combination, first flange or base flange portion 22, defining therein, first aperture means 23 generally disposed in the central planar area thereof, for use in attaching the base flange portion 22 to chain link substrate carrier means 31 of chain link drive mechanism 10 by use of rotatable threaded bolt-like fastener means 28, and including generally 90 degree depending second flange or side flange portion 24 in generally flattened configuration and attached to and depending from the base flange portion 22 by approximately 90 degrees to present an L-shaped bracket member 20, and defining second aperture means in the form of spaced apart pair of apertures 34 defined to extend through the outer oppositely disposed upper regions of the side flange portion 24 for use in attaching the side flange portion 24 by second fastener means 33 to disconnected adjacently disposed and gapped apart end-to-end oriented chain links 35 and 37, whereby the flattened side flange portion 24 provides bridge means or linking means to link or connect the disconnected links 35 and 37 together, and including third aperture means 26 being defined in the generally central lower planar area of the side flange portion 24 and located adjacently to the bolt-like fastener means 28 to allow unrestricted rotational movements of head portion 29 of the bolt-like fastener means 28 by interaction with the third aperture means 26, whereby rotational movement of the head portion 29 of the fastener means 28 is positioned to be free of striking interference with adjacently disposed side flange portion 24 of the L-shaped link bracket member 20 of this invention.

It is in accordance with the advantage of the present invention over the prior pertinent art, that the side flange 24 is configured to be uniformly flattened to provide in assembly combination with a pair of such chain link brackets 20 with flattened side flanges 24, that the flattened thickness of the opposing pieces of the side flange members 24 of the bracket members 20, define the gap or cavity area 19 defined between the back to back side flanges 24, for receiving tooth gears (not shown), so as not to lessened or reduce the dimensions of the gap opening 19 from the corresponding gap dimensions defined by the remaining other parallel spaced links of the chain link drive mechanism 10 (not shown) wherein no such replacement chain link assembly is required to be present. FIG. 1 shows the clear view of the assembly of the pair of chain link brackets 20 of the present invention forming or defining in assembly with the flattened side flange portions 24, the gap 19 formed between the side flange portions 24 into which the gear tooth (not shown) is to be received. It is in accordance with this invention to provide the novel and improved chain link bracket 20 with a flattened side flange portion 24 with which to provide in assembly, the gap 19 of the same relative dimension as other gaps similar to gap 19 wherein no replacement chain link assembly is present.

Therefore, as shown in the Drawings and particularly in FIG. 1 thereof, in accordance with the preferred embodiment of the present invention, an identical pair of the novel mounting brackets 20 are mounted by fastener 28 to substrate carrier member 31 in back-to-back mirror image parallel opposed positions, and their side flange portions 24 are connected to adjacent chain links 35 and 36 of the chain mechanism 10, and are generally flattened to lie in a common plane of symmetry without offset in any manner whatsoever, and when so mounted, define the aforementioned gap opening 19 therebetween, into which a gear tooth (not shown) is to be received for converting rotational drive to linear movement of the chain mechanism 10. The providing of the flattened side flanges 24 when mounted in assembly of FIG. 1, provide the gap 19 to be of optimum dimension and generally the same dimension as the gaps formed (not shown but presumed known by the practitioner of the pertinent art) by other chain links of the chain link mechanism 10. The aperture means 26 is added to the side flange member 24 to prevent interference of the side flange member 24 with the rotating movement of the fastener 28 when mounting the base flange member 22 is mounted to the substrate carrier 31.

The bracket assembly of FIG. 1 is comprised of a pair of chain link bracket members 20 comprising chain link bracket means, for mounting to a chain link drive mechanism 10 comprised of multiple chain links such as 35 and 37 links, wherein the pair of bracket members 20 each are comprised of a generally flat base flange 22 and a 90 degree depending generally flat side flange 24 formed in an L-shaped bracket member, and first aperture means 23 is defined in base flange 22 and is intended to receive a rotatable threaded bolt-like fastener means 28, and second aperture means 34 are defined in end regions of the length dimension of the side flange 24, and third aperture means 26 is defined in the generally central and lower region of the side flange 24 adjacent to the rotatable fastener 28 to remove the potentially interfering region of the inner surface of the side flange 24 where the aperture means 26 is defined, thus, to prevent striking interference between the rotatable fastener 28 and the adjacently disposed regions of the side flange 24, and when mounted in assembly, the pair of brackets 20 define therebetween the intermediate gap 19 within which to receive a tooth gear drive means (not shown) to move the chain link mechanism 10 in proportion to the reciprocal movement of the gear drive means, and whereby the defined gap dimension of gap 19 is provided to correspond to or match other similar gap dimensions for receiving tooth gear drive means, and the side flange 24 is generally flattened without offset in its thickness dimension so as not to reduce the size dimension of gap 19.

An improved chain link bracket assembly as shown in the Drawings, is provided for mounting to reconnect separated end-to-end parallel spaced chain links 35 and 37 of the chain drive mechanism 10, comprising in combination a pair of identical chain link bracket members 20 mounted in back-to-back mirror image positioning on and attached to substrate carrier member 31 of the chain drive mechanism 10, each of the chain link bracket members 20 including in combination, a flattened base flange portion 22 with a central first aperture 23 provided to receive mountable rotatable bolt-like fastener 28, whereby the base flange portion 22 is mounted to the substrate carrier means 31, a flattened elongated link-shaped side flange portion 24 depending from the base flange portion 22 by approximately 90 degrees to provide an L-shaped configuration, and having a pair of second apertures 34 in oppositely spaced distal free-end regions of the elongated dimension of the link-shaped side flange portion 24 to allow the distal free-end portions thereof to be connected to separated end-to-end parallel spaced chain links 35 and 37 of the chain drive mechanism 10, and defining between the side flange portions 24 when mounted as a pair of chain link brackets 20 in assembly, a gap opening 19 therebetween into which to receive insertable portion (not shown) of a reciprocal chain drive mechanism to convert reciprocal movement to linear movement of the chain link mechanism 10, said gap opening 19 being substantially identical to the similar gap openings (not numbered) formed by other spaced chain links 35 and 37 of the chain link mechanism 10, and the side flange portion 24 being flattened of uniform thickness without offset thereof in the direction into the gap opening 19 defined between a pair of side flanges in mounted assembly, and the side flange portion 24 containing third aperture 26 through the thickness dimension thereof, positioned generally in the central lower region of the side flange portion 24 located adjacently to and opposite of the rotatable head 29 of the bolt fastener 28, the aperture opening 26 being of dimension to allow the encroachment of the rotational bolt head 29 into the aperture 26, to prevent any striking interference with the rotating head 29 of the bolt fastener 28 with the inner planar surface of the side flange 24.

In summary of the improved link chain bracket assembly of the chain link drive mechanism 10, includes in combination, an improved L-shaped link chain bracket assembly comprised of a pair of parallel spaced and back-to-back mirror image mounted L-shaped bracket members 20 in application to reconnect a conventional disconnected ends of an end-to-end parallel spaced chain link drive mechanism 10, each bracket member 20 including a base flange 22 mountable to a selected substrate carrier member 31 of the drive mechanism 10 by rotatable bolt member 28, and a side flange 24 depending from the base flange 22 generally perpendicularly thereto, to define between the pair of back-to-back side flanges 24, an intermediate gap opening 19 disposed between parallel spaced end-to-end chain links 35 and 37 and the parallel side flanges 24 of the pair of bracket members 20, in which to receive an aligned reciprocal rotatable gear tooth (not shown) of gear drive means (not shown) to provide linear movement to the chain link drive mechanism 10, the improvement comprising to each of the bracket members 20, a generally flattened thickness dimension to the side flange 24 to define the gap opening 19 to be of uniform gap opening of comparable size dimension to other gap openings (not shown) of uniform size dimensions of the chain link drive mechanism 10, and additionally, to provide aperture opening 26 in the flattened side flange 24 of the improved bracket member 20 to lie disposed adjacently of and in at least tangential relationship to the rotatable bolt 28 mounting the base flange 22, so as to remove any potential or actual interfering contact with adjacently disposed areas of the flattened side flange 24 during rotational bolt 28 movement.

Other equally equivalent embodiments of the present invention are readily apparent, and their inclusions or provisions are thought to be unnecessary and readily available to the practitioner of the pertinent art. All such obvious and apparent embodiments are intended to be included in the detailed description made herein. Minor modifications, choices of materials, precise dimensions, relative configurations of component parts, and the like are intended to be included herein, and are choices to be readily made by the practitioner of the pertinent art without deviation from the scope and intent and teachings of the present invention. The present invention is limited to the invention claimed in the following claims hereinafter set forth and the equivalents thereof.

What is claimed is:

1. An improved chain link bracket assembly for mounting to reconnect separated end-to-end parallel spaced chain links of a chain drive mechanism mounted on substrate carrier means and connected by parallel spaced continuous link pins providing gap openings between the link pins and adjacent bridging parallel spaced chain links forming the chain drive mechanism driven for linear movement by engaging reciprocal toothed sprocket gear drive means, the bracket assembly comprising in combination a pair of identical chain link bracket members mounted in back-to-back mirror image positioning on and attached to the substrate carrier means of the chain drive mechanism, each of the chain link bracket members having a flattened base flange portion with first aperture means provided generally centrally thereof to receive threaded rotatable bolt-like fastener means to mount the base flange portion in threaded engagement to the substrate carrier means, and having a flattened elongated link-shaped side flange portion defining distal free-end portions thereof, which side flange portion is attached to and depends from the base flange portion by approximately 90 degrees to provide an L-shaped configuration with the base flange portion, the side flange portion including a pair of second aperture means located in oppositely spaced distal free-end regions of an elongated dimension of the link-shaped side flange portion to receive link pins to connect the side flange portion to matching separated distal openings in the separated end-to-end parallel spaced chain links of the chain drive mechanism, whereby the side flange portion provides the replacement link chain of each side of the dual sided chain link assembly, and the pair of side flange portions in back-to-back assembly spaced apart and connected to end-to-end link pins of the chain link assembly, define a gap opening therebetween in which to receive insertable tooth portions of the reciprocal toothed sprocket gear drive means to convert reciprocal movement to linear movement of the chain link mechanism, said gap opening being substantially uniform in dimensional size to the uniform sized reoccurring consecutively spaced gap openings formed by other consecutively spaced chain links of the chain link mechanism, and the side flange portion being of uniform thickness dimension to provide mirror image of other chain links, and without offset of side flange thickness in the direction into the gap opening defined between the pair of side flange portions of the chain link bracket members, and the side flange portion containing third aperture means extending through the thickness dimension thereof, provided generally in the central lower region of the side flange portion located adjacently to and opposite of the rotatable head portion of the bolt-like fastener means, to remove any adjacently disposed regions of the side flange portion from striking interference with the rotating head portion of the bolt-like fastener means.

2. The chain link bracket assembly of claim 1 wherein the third aperture means is comprised of a central aperture opening extending through the thickness dimension of the side flange portion and being of a circumference larger than the width and height of the rotatable head portion of the bolt-like rotatable fastener means to provide for the rotational radius of the head portion of the bolt to encroach into the adjacent central aperture opening of the side flange portion, and the bolt-like fastener means includes a threaded shank portion which is threadedly received into the substrate carrier means of the chain link drive mechanism to mount the base portion of the chain link bracket member thereto.

3. The chain link bracket assembly of claim 2 wherein the rotating radius defined by the rotation of the head portion of the bolt-like rotatable fastener means, provides its tangent at least in near proximity to potentially strike the inner surface of the side flange portion, and the first aperture means of the base flange portion is positioned in adjacent alignment with and oppositely disposed from the circumferential opening of the central aperture provided in the side flange portion of the chain link bracket member and receives the insertable fastener means with rotating bolt head portion, whereby striking interference between the side flange portion and the rotating bolt head portion of the fastener means when inserted into the first aperture means is prevented by the proximate positioning and size of the central aperture opening of the second flange portion.

4. The chain link bracket assembly of claim 1 wherein the parallel spaced side flange portions of the pair of bracket members are disposed to lie in the parallel spaced common planes of symmetry in which interconnecting parallel link chains of the chain link mechanism are disposed, and the side flange portions are of flattened thickness dimension without offset thereof in a direction inwardly of the gap opening formed therebetween.

5. An improved chain link bracket assembly for mounting to reconnect separated end-to-end parallel spaced chain links of a chain drive mechanism mounted on substrate carrier means and connected by parallel spaced continuous link pins providing gap openings between the link pins and adjacent bridging parallel spaced chain links forming the chain drive mechanism driven for linear movement by an engaging toothed sprocket gear drive mechanism, the bracket assembly comprising in combination a pair of identical chain link bracket members mounted in back-to-back mirror image position on and attached to substrate carrier means of the chain drive mechanism, each of the chain link bracket members having a flattened base flange portion with a central first aperture provided to receive insertable threaded bolt fastener member with head portion and threaded shank portion to mount the base flange portion to the substrate carrier means, and including a flattened elongated link-shaped side flange portion having distal free-end portions, attached to and depending from the base flange portion by approximately 90 degrees to provide an L-shaped configuration of the chain link bracket member, and the side flange portion including a pair of second apertures in oppositely spaced distal free-end portions of an elongated dimension of the link-shaped side flange portion to allow the free-end portions thereof to be connected to matching oriented and separated end-to-end parallel spaced chain links of a chain drive mechanism to provide interlinking of the disconnected chain links thereof, and defining in the spacing between the back-to-back parallel spaced side flange portions of the pair of chain link bracket members mounted in assembly, a gap opening therebetween into which to receive insertable portion of the engaging toothed sprocket gear drive mechanism to provide linear movement of the chain drive mechanism, the gap opening being of substantially uniform size and dimension to other uniform gap openings formed between other parallel spaced chain links of the chain link mechanism, and each of the side flange portions being of flattened thickness dimension without offset thereof in a direction inwardly of the gap opening formed therebetween, and the side flange portion containing a third aperture extending through the thickness dimension thereof, provided generally in the central lower region of the side flange portion located adjacently to and opposite of the rotatable head portion of the bolt fastener to provide removal of any adjacently disposed thickness regions of the side flange portion from interference with the rotating head portion of the bolt fastener.

6. The chain link bracket assembly of claim 5 wherein the third aperture is comprised of a central aperture opening extending through the thickness dimension of the side flange portion and of a circumference larger than the width and height of the rotatable head portion of the bolt rotatable fastener, and the bolt fastener includes a threaded shank portion which is threadedly received into the substrate carrier means of the chain link drive mechanism to mount the base portion of the chain link bracket thereto.

7. The chain link bracket assembly of claim 6 wherein the rotating radius defined by the rotation of the head portion of the bolt fastener extends to interfere with the inner surface of the side flange portion, extending into circumferential opening of the central aperture provided in the side flange portion of the bracket member whereby striking interference between the proximate adjacent portions of the side flange portion and the rotating bolt head is avoided.

8. The chain link bracket assembly of claim 5 wherein the side flange portions are each disposed to lie in a common plane of symmetry with the plane of symmetry of the end-to-end connected chain links of the chain link drive mechanism, and each side flange portion lies in said common plane of symmetry without offset of the thickness dimension thereof.

9. An improved L-shaped link chain bracket assembly comprising a pair of parallel spaced and back-to-back mirror image mounted L-shaped bracket members to reconnect a conventional end-to-end parallel spaced chain link drive mechanism, each bracket member having a base flange mountable to a selected substrate carrier member of the drive mechanism by rotatable bolt member, and a side flange depending from the base flange generally perpendicularly thereto, to define between a pair of back-to-back side flanges, an intermediate gap opening disposed between parallel spaced end-to-end chain links and the parallel side flanges of the pair of bracket members, and in which to receive an aligned reciprocal rotatable gear tooth of gear drive means to provide linear movement to the chain link drive mechanism, the improvement comprising to each of the bracket members, a generally flattened thickness dimension to the side flange to define the intermediate gap opening to be of uniform size and dimension to other gap openings of the chain link drive mechanism, and additionally, to provide an aperture opening in the flattened side flange of the improved bracket member to lie disposed adjacently of and in at least tangential relationship to the base flange rotatable bolt to remove any interfering contact with adjacently disposed areas of the flattened side flange during rotational bolt movement.

\* \* \* \* \*